(12) United States Patent
Hironaka et al.

(10) Patent No.: US 6,251,170 B1
(45) Date of Patent: Jun. 26, 2001

(54) ELECTRONIC DUST COLLECTOR AND AIR CONDITIONER WITH ELECTRONIC DUST COLLECTOR

(75) Inventors: Yasumasa Hironaka, Nara; Hisanobu Tanaka, Osaka; Shinji Yoshida, Neyagawa, all of (JP)

(73) Assignee: Funai Electric Co., Ltd. (JP)

( * ) Notice: Subject to any disclaimer, the term of this patent is extended or adjusted under 35 U.S.C. 154(b) by 0 days.

(21) Appl. No.: 09/218,359

(22) Filed: Dec. 22, 1998

(30) Foreign Application Priority Data

Dec. 22, 1997 (JP) .................................................. 9-353731

(51) Int. Cl.⁷ ...................................................... B03C 3/74
(52) U.S. Cl. ...................... 96/28; 55/282.3; 55/DIG. 10; 95/73; 95/74; 96/90; 96/96
(58) Field of Search .................................... 96/96, 90, 28, 96/225; 95/73, 74; 55/282.3, DIG. 10

(56) References Cited

U.S. PATENT DOCUMENTS

| | | | |
|---|---|---|---|
| 2,825,102 | * 3/1958 | Hicks et al. | ........................... 95/73 X |
| 4,349,359 | * 9/1982 | Fitch et al. | ............................ 96/96 X |
| 4,666,474 | * 5/1987 | Cook | ..................................... 96/96 X |
| 5,290,343 | * 3/1994 | Morita et al. | ......................... 96/96 X |
| 5,456,741 | * 10/1995 | Takahara et al. | ..................... 96/96 X |

FOREIGN PATENT DOCUMENTS

| | | | |
|---|---|---|---|
| 553753 | * 6/1943 | (GB) | .......................... 96/90 |
| 37-15989 | * 10/1962 | (JP) | ........................ 96/90 |
| 01028427 | 1/1989 | (JP) | . |
| 6428427 | 1/1989 | (JP) | . |
| 4-317754 | * 11/1992 | (JP) | ......................... 96/96 |
| 7232101 | 9/1995 | (JP) | . |
| 7232101A | 9/1995 | (JP) | . |

* cited by examiner

*Primary Examiner*—Richard L. Chiesa
(74) *Attorney, Agent, or Firm*—Morrison Law Firm

(57) ABSTRACT

An electronic dust collector has a discharge line spaced parallel to a dust collector electrode. Discharge line fixing parts at the ends of the discharge line are bent outward to increase the distance from the dust collector electrode, thereby reducing the likelihood of abnormal discharge between the discharge line fixing parts and the dust collector electrode. In another embodiment, the discharge line and the discharge line fixing parts remain in alignment, and the ends of the dust collector electrode facing the line fixing parts are bent outward. The electronic dust collector may be part of an air conditioner. The dust collector electrode has a heater therein for self cleaning.

8 Claims, 7 Drawing Sheets

ELECTRONIC DUST COLLECTOR AND AIR CONDITIONER WITH ELECTRONIC DUST COLLECTOR

BACKGROUND OF THE INVENTION

1. Field of the Invention

The present invention relates to an electronic dust collector and an air conditioner equipped with electronic dust collector, and more particularly, to a technique for preventing abnormal discharge between the electrodes of an electronic dust collector.

2. Description of the Prior Art

Hitherto, as a device for cleaning air by collecting dust, fine particles, etc. contained in air using a discharge effect, there has been known an electronic dust collector, sometimes known as a precipitation air cleaner.

Referring to FIG. 11, an essential part of conventional electronic dust collector 101 includes a discharge electrode 10 and a dust collection electrode 120. A high voltage applied between electrodes 110 and 120 ionizes the dust and fine particles in the surrounding air as it passes the discharge electrode 110. Electrode 110 is positive with respect to electrode 120. Thus, the dust and fine particles are given a positive charge which attracts them to the negatively charged dust collection electrode 120. The dust and other particles are adsorbed on the dust collection electrode 120, whereby air is purified. A discharge line 111 of the discharge electrode 110 has connected at each of its ends 111a an extension spring 112. Tension of the extension springs 111a hold the discharge line in its set position by the tension of the extension spring 112. The dust collection electrode 120 has a linear shape. The dust collection electrode 120 is positioned a predetermined distance from, and parallel to, the discharge electrode 110.

However, in the electronic dust collector 101 described above, the distance d' between the extension spring 112 and the dust collection electrode 120 is smaller than the distance d between the discharge line 111 and the dust collection electrode 120. As a result of this smaller distance, there is a high probability that an abnormal discharge will occur between the extension spring 112 and the dust collection electrode 120. The abnormal discharge lowers the dust collection rate and generates unpleasant snapping noises.

OBJECTS AND SUMMARY OF THE INVENTION

It is an object of the invention to provide an electronic dust collector which overcomes the drawbacks of the prior art.

It is a further object of the present invention to provide an electronic dust collector and an air conditioner equipped with the electronic dust collector in which abnormal discharge and reduced dust collection efficiency is prevented. These objects are secured by providing a maintaining predetermined distance between the discharge line fixing part and the dust collection electrode.

In order to attain the above object, the present invention provides an electronic dust collector comprising a discharge electrode and a dust collection electrode in parallel at a predetermined distance from each other with a high voltage applicable between them. The dust collector collects dust contained in air onto the dust collection electrode by way of the discharge effect. A discharge line, which constitutes the discharge electrode, is fixed to a power supply part through the discharge line fixing part. A position of the dust collection electrode opposed to the discharge line fixing part is bent in the direction away from the discharge line fixing part.

In this constitution, during the dust collection operation of the electronic dust collector, a high voltage is applied between the discharge electrode and the dust collection electrode. The dust contained in the air introduced in the dust collector is ionized by the discharge electrode and adsorbed to the dust collection electrode, by which the introduced air is cleaned. Here, the position opposed to the discharge line fixing part of the dust collection electrode is bent in the direction away from the discharge electrode, so that the distance between the discharge line fixing part and the dust collection electrode is not shorter than that from other discharge parts.

Accordingly, the generation of abnormal discharge from the discharge line fixing part, and the lowering of production efficiency and generation of unpleasant abnormal sounds are all avoided.

The present invention provides an electronic dust collector comprising a discharge electrode and a dust collection electrode in parallel at a predetermined distance with a high voltage applicable between them. The dust collector collects dust contained in air onto the dust collection electrode by way of the discharge effect. A discharge line, which constitutes the discharge electrode, is fixed to a power supply part through the discharge line fixing part. Both ends of the discharge line are bent so that the discharge line fixing part of the discharge electrode is held away from the dust collection electrode.

The distance between the discharge line fixing part and the dust collection electrode does not become nearer than that of other discharge part, and the same action as that described above is obtained.

Also, it is desirable for the above dust collection electrode to contain a heater for self-cleaning the dust collection electrode. In this constitution, by controlling the application of electricity to the heater, the dust collection electrode is subjected to temperature elevation to remove dust and fine particles deposited on the electrode.

The present invention also provides an air conditioner with electronic dust collector for conditioning the interior air and purifying air by collecting dust in air by using an electric discharge effect, comprising: a casing having an air suction port and an air outlet port, a heat exchanger in the casing facing to the suction port, a fan for circulating air into the suction port through air passages in the heat exchanger and the casing and out through the air outlet port; and an electronic dust collector arrayed in the air passages for collecting dust in air which passes through the air passages by using the discharge effect. The dust collector comprising a discharge electrode and a dust collection electrode arrayed in parallel at a predetermined distance and between which a high voltage is to be applied; a discharge line constituting the discharge electrode being fixed at both ends thereof to the power supply part through the discharge line fixing part; and the position opposed to the discharge line fixing part of the dust collection electrode being bent in the direction of alienation from the discharge line fixing part.

In this constitution, during the air conditioning operation the heat exchanger and the fan are driven to introduce air through the suction port of the casing, and the thus introduced air is cooled or heated by the heat exchanger, after which it is circulated in the air passage. At this time, because a high voltage is applied between the discharge electrode of the electronic dust collector and the dust collection electrode provided on the air passage, the dust contained in air which flows through the air passage is ionized by the discharge electrode and deposited on the dust collection electrode. By this step, the air is cleaned and blown from the air outlet port. Further, since the distance between the discharge line fixing part and the dust collection electrode is closer than to other discharge parts, the same action as that described above is obtainable.

Also, the present invention provides an air conditioner with electronic dust collector for conditioning the interior air and purifying air by collecting dust in air by using an electric discharge effect, comprising: a casing having an air suction port and an air outlet port; a heat exchanger in the casing facing the suction port; a fan for circulating air into the suction port through the heat exchanger and air passages in the casing and out the air outlet port; and an electronic dust collector arrayed in the air passages for collecting dust in air which passes through the air passages by using the discharge effect; the dust collector comprising a discharge electrode and a dust collection electrode arrayed in parallel at a predetermined distance and between which a high voltage is applied; the discharge line constituting the discharge electrode is fixed at both ends thereof to the power supply part through the discharge fine fixing part; and both ends of the discharge line are bent so that the discharge line fixing part of the discharge electrode is held away from the dust collection electrode.

Briefly stated, the present invention provides an electronic dust collector having a discharge line spaced parallel to a dust collector electrode. Discharge line fixing parts at the ends of the discharge line are bent outward to increase the distance from the dust collector electrode, thereby reducing the likelihood of abnormal discharge between the discharge line fixing parts and the dust collector electrode. In another embodiment, the discharge line and the discharge line fixing parts remain in alignment, and the ends of the dust collector electrode facing the line fixing parts are bent outward. The electronic dust collector may be part of an air conditioner. The dust collector electrode has a heater therein for self cleaning.

According to an embodiment of the invention, there is provided an electronic dust collector comprising: a discharge electrode, a dust collection electrode parallel to the discharge electrode and spaced a predetermined distance therefrom, means for applying a high voltage applicable between the dust collection electrode and the discharge electrode in a polarity effective to ionize particles and to collect the particles on the dust collection electrode, the discharge electrode including a discharge line, a discharge line fixing part connected to at least one end of the discharge line, and at least one of a portion of the dust collection electrode and a portion of the discharge line fixing part being displaced outward from the other thereof to increase a distance therebetween, whereby abnormal discharge between the discharge line fixing part and the dust collection electrode is reduced.

According to a feature of the invention, there is provided an electronic dust collector comprising: a discharge electrode and a dust collection electrode generally parallel to each other and spaced apart a predetermined distance, means for applying a high voltage between the discharge electrode and the dust collection electrode for the formation of a corona discharge therebetween, the corona discharge being of a type which ionizes particles in air, the particles being collected on the dust collection electrode, the discharge electrode including a discharge line, the means for applying a high voltage including a discharge line fixing part, and at least an end of the discharge line with the discharge line fixing part thereon being bent away from the dust collection electrode, whereby a spacing therebetween is increased to reduce abnormal discharge therebetween.

According to a further feature of the invention, there is provided an air conditioner with electronic dust collector for conditioning the interior air and purifying air by collecting dust in air by using an electric discharge effect, comprising: a casing having an air suction port and an air outlet port, a heat exchanger in the casing facing the suction port, a fan effective for circulating air into the suction port through the heat exchanger and air passages in the casing and out the air outlet port, and an electronic dust collector in the air passages for collecting dust in air which passes through the air passages, the dust collector including a discharge electrode and a dust collection electrode generally parallel to each other and spaced a predetermined distance apart, means for applying a high voltage between the discharge electrode and the dust collection electrode, whereby electronic dust removal is effected, the discharge electrode including a discharge line, the means for applying a high voltage including at least one discharge line fixing part at an end of the discharge line, the discharge line fixing part also including tensioning means for retaining the discharge line in position, and a portion of the dust collection electrode opposed to the discharge line fixing part being bent away from the discharge line fixing part, whereby abnormal discharge therebetween is avoided.

According to a still further feature of the invention, there is provided an air conditioner with electronic dust collector for conditioning the interior air and purifying air by collecting dust in air by using an electric discharge effect, comprising: a casing having an air suction port and an air outlet port, a heat exchanger in the casing facing the suction port, a fan effective for circulating air into the suction port through the heat exchanger and air passages in the casing and out the air outlet port, an electronic dust collector in the air passages for collecting dust in air which passes through the air passages using a discharge effect, the dust collector including a discharge electrode and a dust collection electrode arrayed in parallel and spaced a predetermined distance apart, a first discharge line fixing part at a first end of the discharge line, a second discharge line fixing part at a second end of the discharge line, at least one of the first and second discharge line fixing parts being collectable to a high voltage, and the first and second ends being bent away from the dust collector electrode so that the discharge line fixing part of the discharge electrode is spaced away from the dust collection electrode.

According to another feature of the invention, there is a provided a dust collector comprising: a dust collector electrode, first and second insulating posts, spaced apart to define a span of a discharge line therebetween, generally parallel to the dust collector electrode, a discharge line passing over the first and second insulating posts, a first end of the discharge line beyond the first insulating post being bent away from the dust collector electrode, and a second end of the discharge line beyond the second insulating post being bent away from the dust collector electrode.

Even in this constitution, since the distance between the discharge line fixing part and the dust collection electrode does not come to be closer than that of other discharge part, the same action as that described above is obtained.

Also, it is desirable that the dust collection electrode contains a heater for self-cleaning the dust collection electrode. This self-cleaning may be carried out normally according to necessity after stopping the cooling and heating operation in consideration of the cooling and heating efficiency.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
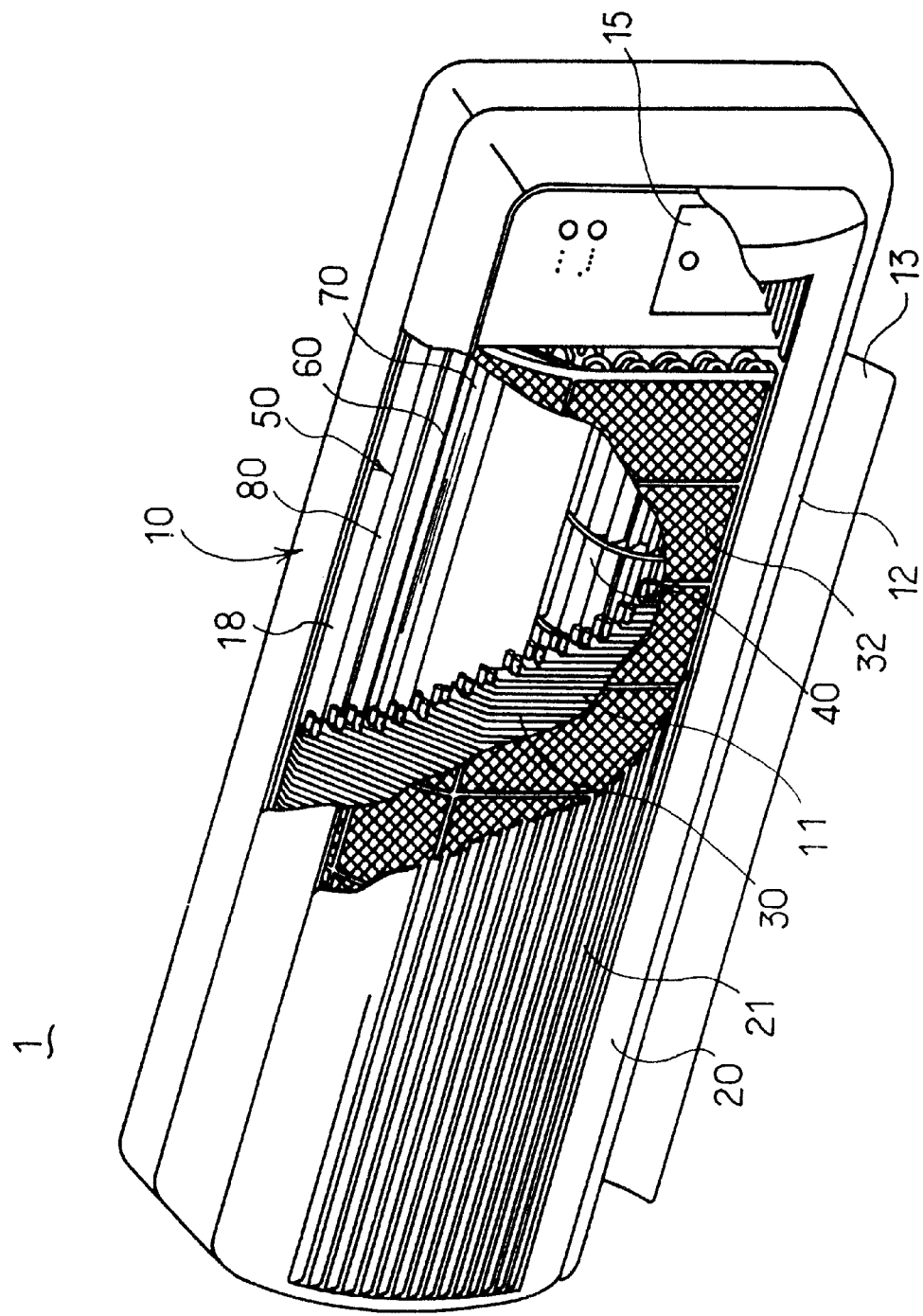
FIG. 1 is a partially broken perspective view of an air conditioner with electronic dust collector according to a first embodiment of the present invention.
Figure 2:
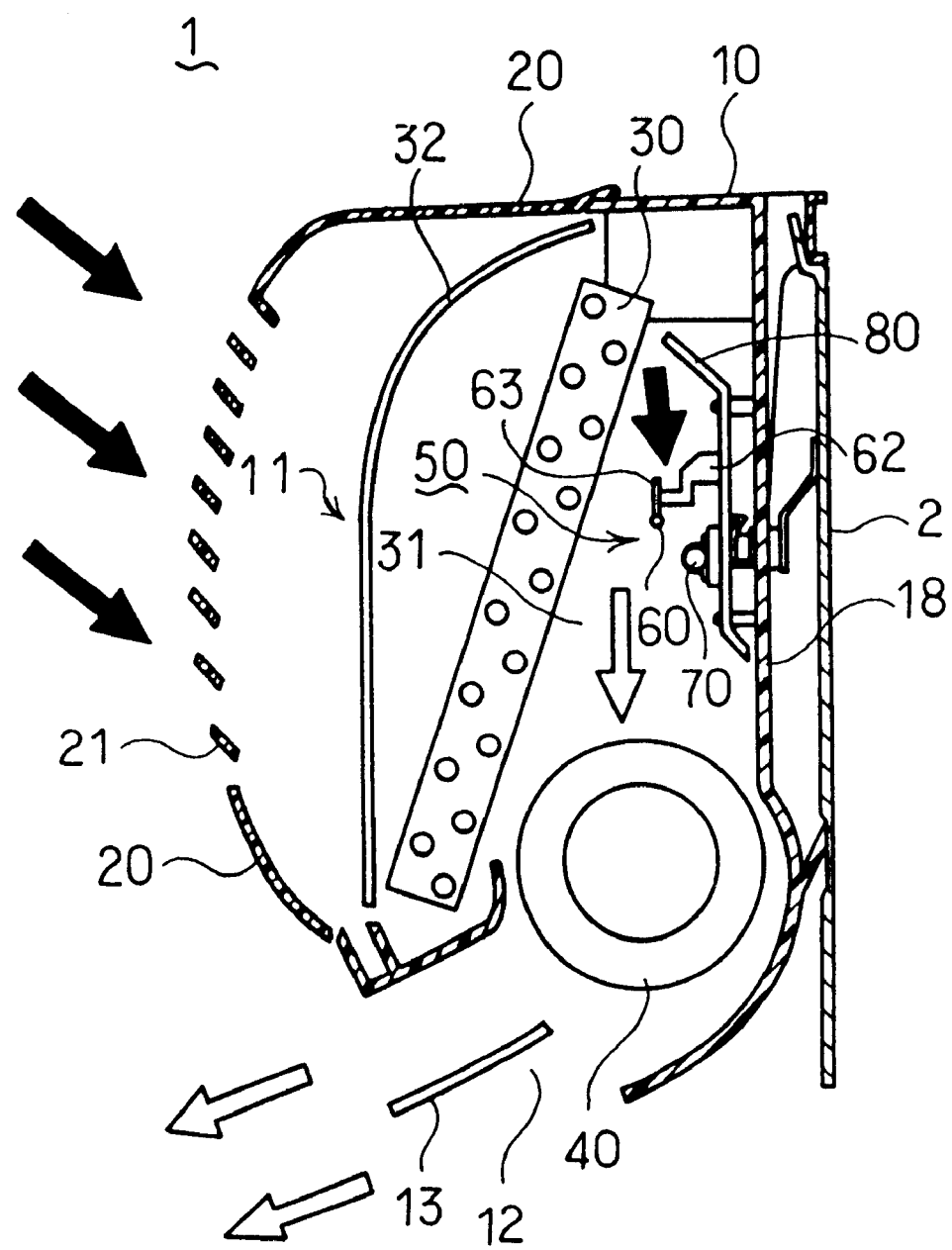
FIG. 2 is a side view of an air conditioner with electronic dust collector showing the flow of air during air conditioning.
Figure 3:
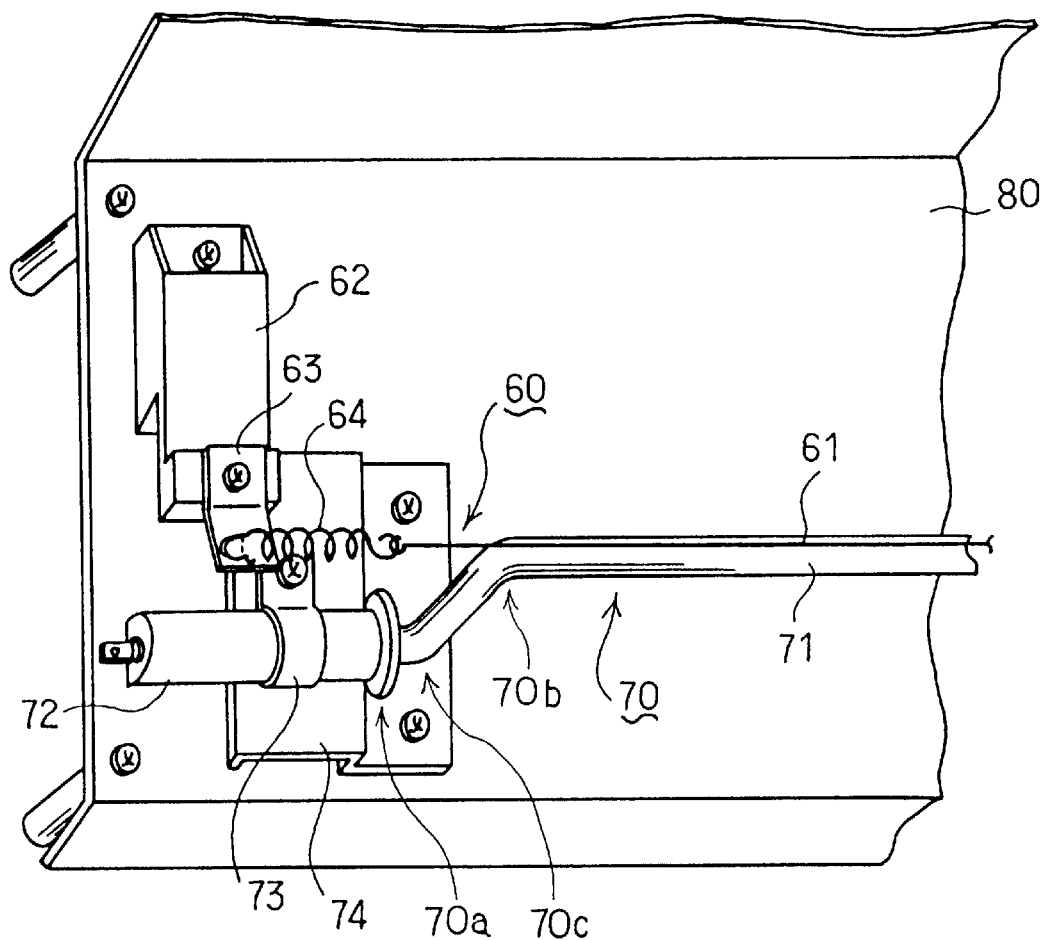
FIG. 3 is a partial perspective view of an electronic dust collector.
Figure 4:
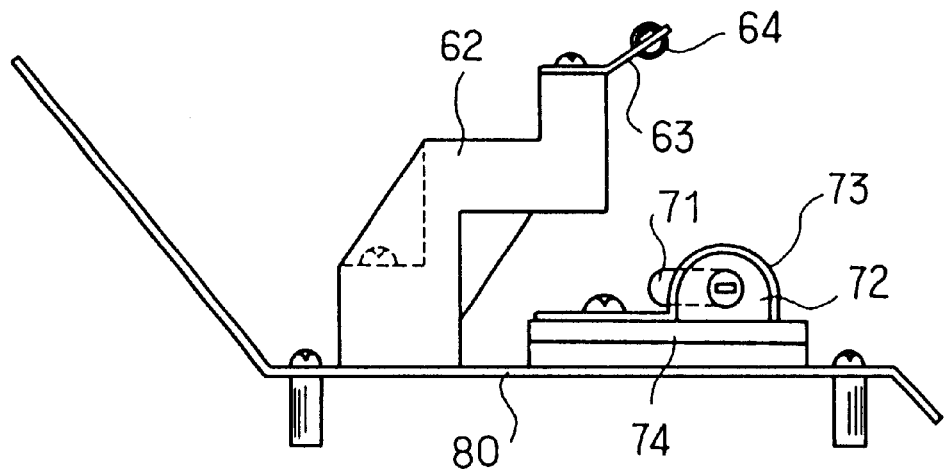
FIG. 4 is a partial side view of an electronic dust collector.
Figure 5:
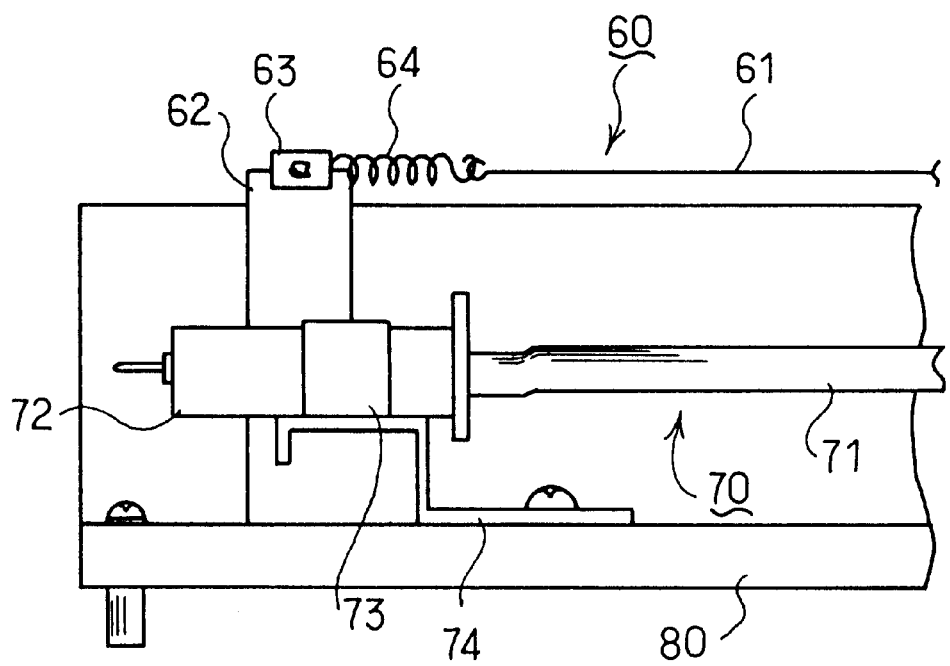
FIG. 5 is a partial bottom view of an electronic dust collector.

Referring to FIGS. 1 through 6, an air conditioner with dust collector 1 has both an air conditioning function for cooling or heating air in room and a dust collection function for removing dust contained in interior air to clean air. The air conditioner with dust collector 1 may be fixed to wall or the like using a fixing plate 2. The air conditioner 1 has a casing 10 which opens at its front face as an air suction port 11 and at its bottom for an air outlet port 12. A front panel 20, having a front grill 21, is fitted to the air suction port 11 of the casing 10. A heat exchanger 30 in the casing 10 faces the suction port. A cross-flow type fan 40 just above the air outlet port 12 circulates air from the suction port 11 to the air outlet port 12 through the heat exchanger 30. An electronic dust collector 50 is disposed in the air passage 31 on the downstream side of the heat exchanger 30. A filter 32 is interposed between the front panel 20 and the heat exchanger 30. An angle adjusting type looper 13 is provided at the air outlet port 12 of the casing 10. In the casing 10 a control circuit 15 (control means) controls all functions of the air conditioner 1. The heat exchanger 30 is connected to a heat exchanger of an external unit (not illustrated) and a coolant pipe.

The electronic dust collector 50 includes a horizontally stretched linear discharge electrode 60, a bar-like dust collection electrode 70. The discharge electrode 60 and the dust collection electrode are positioned parallel to each other spaced apart a predetermined distance. The dust collection electrode 70 contains a sheathed heater 71 (see FIG. 7) for self-cleaning. The discharge electrode 60 and the dust collection electrode 70 are mounted on a heat shielding plate 80. The discharge electrode 60 and the dust collection electrode 70 are fixed to the surface of the vertical back plate part 18 so as to face the inside of the air passage 31.

The discharge line 61 which constitutes a discharge electrode 60 is supported and tensioned by a tensile spring 64 (discharge line fixing part) to the electrode 63 (power supply part) which is fixed at both ends 61a to the holding member 62. A voltage is applied to the discharge line 61 from the electrode 63 through the tensile spring 64. The dust collection electrode 70 is disposed a predetermined distance on the lee or downstream side of the air path 31 from the discharge electrode 60. In one embodiment, the distance between the discharge line 61 and the dust collection electrode 70 is, for example, about 14 mm. The lengthwise end parts 72 of dust collection electrode 70 are fixed to the holding members 74 by stopper members 73.

Figure 6:
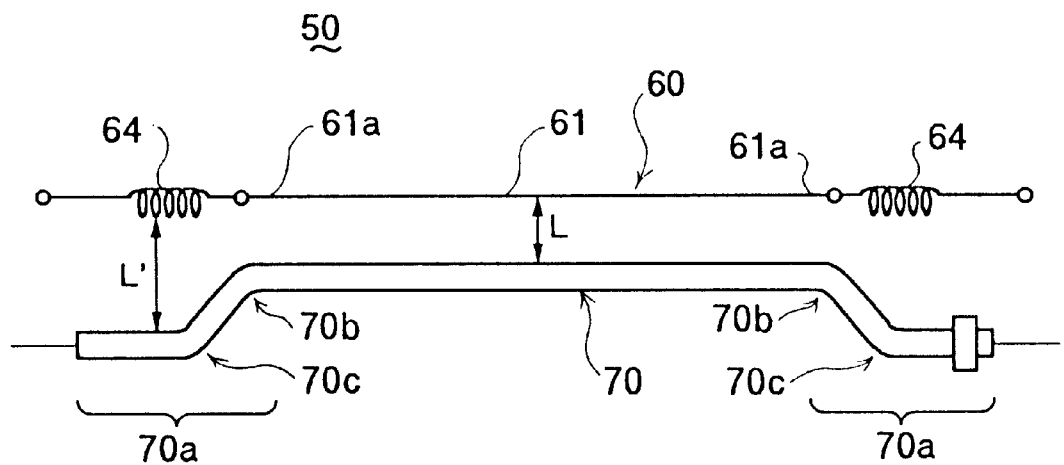
FIG. 6 is a schematic diagram showing the discharge electrode and the dust collection electrode of the electronic dust collector.

As shown in FIG. 6, the position 70a opposed to the extension spring 64 of the dust collection electrode 70 is bent at the bend part 70b toward the direction away from the discharge electrode 60, and is further bent at the bend part 70c to return the remainder parallel to the discharge electrode 60. To the discharge electrode 60 and dust collection electrode 70, a positive DC voltage and a negative DC voltage are to be applied, respectively, to perform the air cleaning operation. The holding member 62 and the holding member 74 are to be fixed to the heat shielding plate 80.

Figure 7:
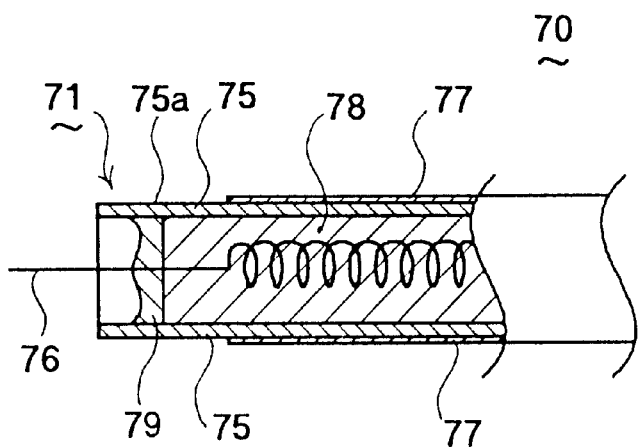
FIG. 7 is a cross-sectional view of the essential part of the dust collection electrode.

In FIG. 7, the dust collection electrode 70 contains a sheathed heater 71. The sheathed heater 71 includes an aluminum metal tube 75 with an electric resistance line 76 generally centered therein. The surface of the metal tube 75 has formed thereon catalyst layers 77. The catalyst layers 77 may be, for example, catalytic substances represented by zeolite, active alumina, manganese dioxide, etc. The catalyst layers 77 may be applied by any convenient means such as, for example, by deposition or by welding. Zeolite (generally called zeolite) has a three-dimensional net structure having hollow parts, which accelerate the reaction of the molecules adsorbed to the inside of the hollow part. Active alumina (Al2O3) is alumina powder having high adsorption capacity, with has small crystal particle size, large surface area, and is suitable as a catalyst, catalyst carrier, and adsorbing agent. Manganese dioxide ($MnO_2$) functions as a catalyst in the same manner as zeolite and active alumina as stated above. In order to prevent mutual contact between the metal tube 75 and the electric resistance line 76, magnesium oxide 78 is filled in the metal tube 75. The end part 75a of the metal tube 75 is sealed by the glass sealing member 79. This sheathed heater 71 preferably develops small energy per unit area, e.g., approximately 180 W(Watts).

Next, the operation of the air conditioner with dust collector I constituted as above is described. During air conditioning, by operating the heat exchanger 30 and the fan 40, air in the room is introduced into the casing 10 through the front grill 21 of the front panel 20. The air passes through the filter 32 and is cooled or heated by passage through the heat exchanger 30. Thereafter the air flows downward through the air passage 31. The air passing through the air passage 31 moves past the periphery of the dust collector 50. Here, a high voltage applied between the discharge electrode 60 and the dust collection electrode 70 of the dust collector 50 generate a corona discharge between the two electrodes 60 and 70. As a result, dust such as fine particles of tar (oil smoke) of tobacco present in the surrounding air of the discharge electrode 60 or cotton dust has deposited thereon positively charged cations by corona. The fine particles and dust thus become positively charged. The positively charged particles are attracted to the negatively charged dust collector electrode 70 by the Coulomb force between the two electrodes where they are caught by the dust collection electrode 70 to effect electric dust collection. When the air contains odorous components, the odorous components are adsorbed by the catalyst layer 77 of the dust collection electrode 70 and deodorized. Thus, the air which passed through the heat exchanger 30 is purified in the course of passing through the air passage 31 on the back side thereof and discharged into the room through the air outlet port 12.

Further, as shown in FIG. 6, because the position 70a opposed to the extension spring 64 of the dust collection electrode 70 is bent in the direction away from the extension spring 64, the distance L' between the extension spring 64 and the dust collection electrode 70 is greater than the distance L between the discharge line 61 and the dust collection electrode 70. This greater distance prevents abnormal discharge which would otherwise occur between the extension spring 64 and the dust collection electrode 70. By this technique normalization of discharge and suppression of loss of dust collection efficiency are accomplished. Also, this technique suppresses generation of unpleasant abnormal sound.

Because the dust collection electrode 70 is disposed to the lee side of the discharge electrode 60, the wind force of air flowing through the air passage 31 and Coulomb force produced on by dust from the dust collection electrode 70, the dust is directed toward the dust collection electrode 70. By this technique a larger amount of dust is deposited on the dust collection electrode 70 to improve the dust collection effect by the dust collector 50.

By controlling application of electricity to the heater 71 of the dust collection electrode 70, dust of soot or cotton dust adhered to the surface of the dust collection electrode 70 is gradually decomposed by oxidation under the catalytic action of the catalyst and finally converted to colorless, odorless carbon dioxide and vapor at about a temperature exceeding 300° C. and removed from the dust collection electrode 70. As a result of oxidizing the dust stepwise, the dust collection electrode 70 is cleaned while suppressing generation of smoke and odor resulting from ignition of dust, the dust collection electrode 70 is substantially free of maintenance. The ultimate temperature of the dust collection electrode 70 is desirably controlled to a level lower than the lower limit of firing temperature of the substance contained in dust component, i.e., 400° C.

Figure 8:
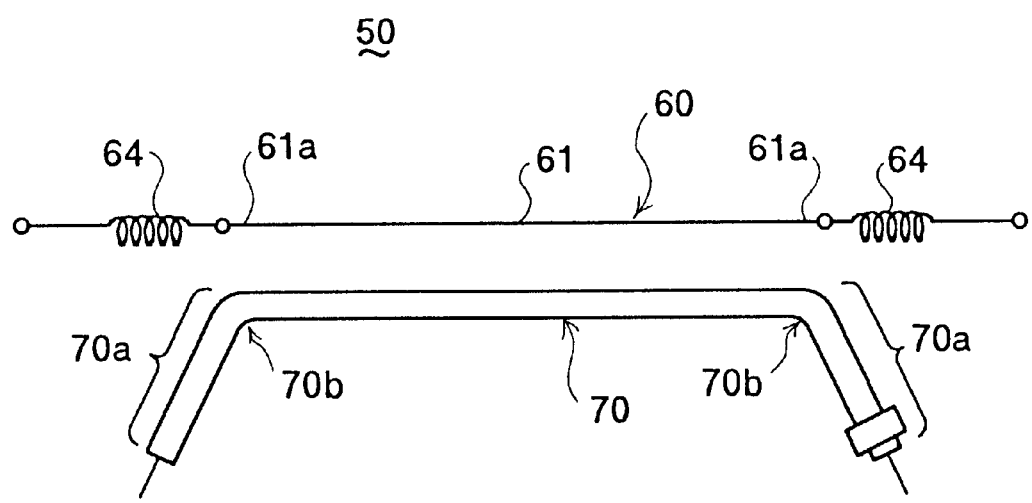
FIG. 8 is a schematic diagram showing the discharge electrode and the dust collection electrode of the electronic dust collector according to the modification example of the first embodiment.

FIG. 8 shows a modification of the first embodiment. The electronic dust collector 50 is made by bending the position 70a opposite the extension spring 64 of the dust collection electrode 70 in the direction away from the discharge electrode 60 in the bent part 70b. In this embodiment length of the bent part of the dust collection electrode 70 is reduced, thereby facilitating processing of the dust collection electrode 70.

Figure 9:
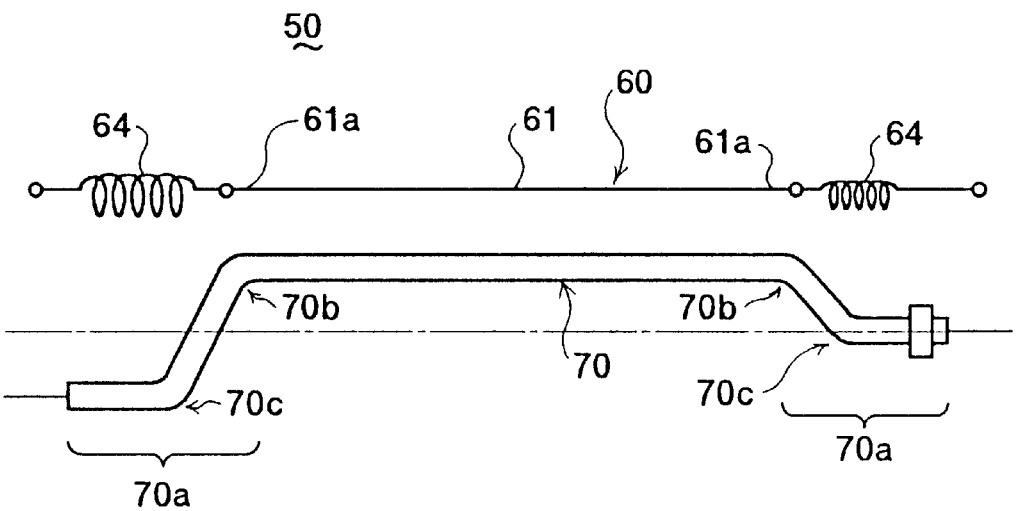
FIG. 9 is a schematic diagram showing the discharge electrode and the dust collection electrode of the electronic dust collector according to a further modification example of the first embodiment.

Referring now to FIG. 9, another modification of the first embodiment includes an electronic dust collector 50, similar to in the electronic dust collector as shown in FIG. 6 above, except that the distance between the extension spring 64 and the position 70a of the dust collection electrode 70 opposed to the extension spring 64 differs at the two ends of the dust collection electrode 70. This embodiment is suitable where the size of the extension spring 64 to be connected to two ends 61a of the discharge line 61 differ from each another.

Figure 10:
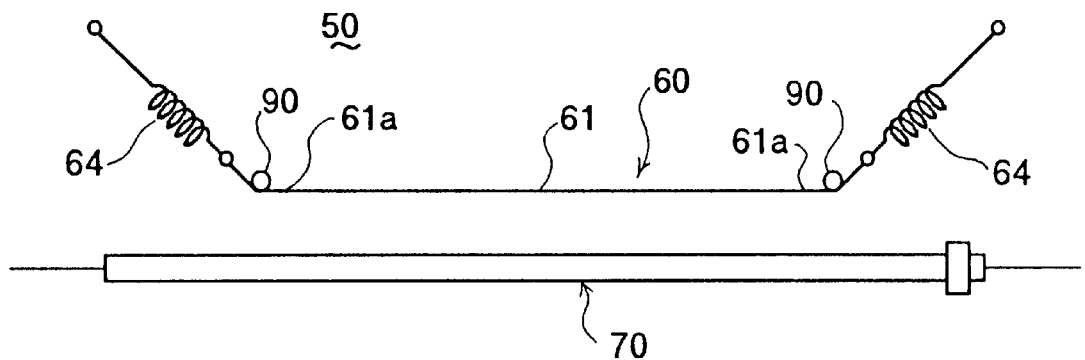
FIG. 10 is a schematic diagram showing the discharge electrode and the dust collection electrode of the electronic dust collector according to a second embodiment of the present invention.
Figure 11:
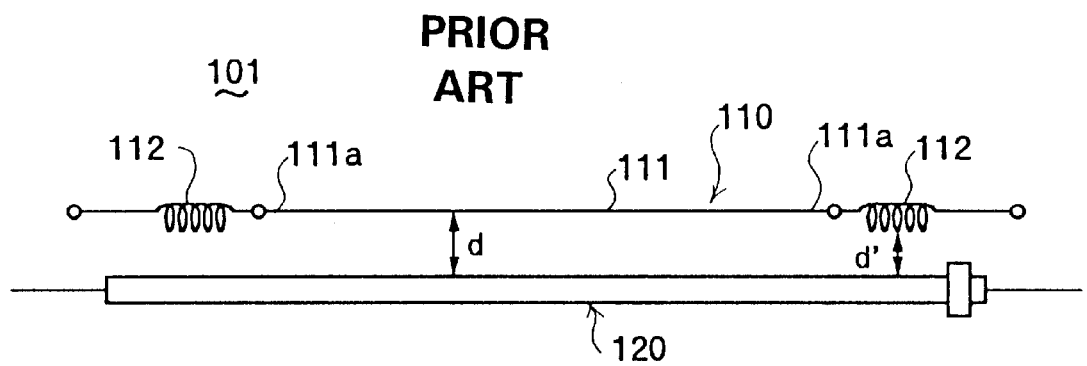
FIG. 11 is a schematic diagram for illustrating the discharge electrode and the dust collection electrode of a conventional electronic dust collector.

In a second embodiment shown in FIG. 10, the dust collection electrode 70 is one having linearity, with both ends of the discharge line 61 bent so as to make the extension spring 64 of the discharge electrode 60 bent away from the dust collection electrode 70. The discharge line 61 is bent at two insulating posts 90 erected a predetermined distance from the dust collection electrode 70. The insulating posts 90 are fixed to the heat shielding plate 80. Thus, even in case both ends 61a of the discharge line 61 are bent to move the pulling spring 64 of the discharge electrode 60 away from the dust collection electrode 70, and thereby prevent abnormal discharge between the extension spring 64 and the dust collection electrode 70. As a result, loss of dust collection efficiency and generation of unpleasant abnormal sound are both avoided. Furthermore, whereas in the case of the electronic dust collector shown in the first embodiment above, bend processing to the dust collection electrode 70 is necessary, and the bend processing is a factor for increase in cost, in the embodiment of FIG. 10, provision of bend processing to the dust collection electrode 70 is unnecessary, so reduced manufacturing cost is achieved.

Without being limited to the foregoing embodiment, various modifications are feasible in the present invention. For example, in an electronic dust collector having only the air-cleaning function, the system may be such that the distance between the discharge line fixing part and the dust collection electrode thereof is secured. Even in such a case, it is possible to prevent abnormal discharge and loss of dust collection efficiency.

In a further embodiment of the invention, both the end of the discharge line and the end of the dust collection electrode are displaced apart.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An electronic dust collector comprising:
    a discharge electrode;
    a dust collection electrode parallel to said discharge electrode and spaced a predetermined distance therefrom;
    means for applying a high voltage applicable between said dust collection electrode and said discharge electrode in a polarity effective to ionize particles and to collect said particles on said dust collection electrode;
    said discharge electrode including a discharge line;
    a discharge line fixing part connected to at least one end of said discharge line; and
    at least one of a portion of said dust collection electrode and a portion of said discharge line fixing part being bent outward from the other thereof to increase a distance therebetween, whereby abnormal discharge between said discharge line fixing part and said dust collection electrode is reduced.

2. The electronic dust collector according to claim 1, wherein said dust collection electrode contains a heater for self-cleaning said dust collection electrode.

3. An electronic dust collector comprising:
    a discharge electrode and a dust collection electrode generally parallel to each other and spaced apart a predetermined distance;

means for applying a high voltage between said discharge electrode and said dust collection electrode for the formation of a corona discharge therebetween;

said corona discharge ionizing particles in air, said particles being collected on said dust collection electrode;

said discharge electrode including a discharge line;

said means for applying a high voltage including a discharge line fixing part; and at least an end of said discharge line with said discharge line fixing part thereon being bent away from said dust collection electrode, whereby a spacing therebetween is increased to reduce abnormal discharge therebetween.

4. The electronic dust collector according to claim 3, wherein said dust collection electrode contains a heater for self-cleaning said dust collection electrode.

5. An air conditioner with electronic dust collector for conditioning the interior air and purifying air by collecting dust in air by using an electric discharge effect, comprising:

a casing having an air suction port and an air outlet port;

a heat exchanger in said casing facing said suction port;

a fan effective for circulating air into said suction port through said heat exchanger and air passages in said casing and out said air outlet port; and an electronic dust collector in said air passages for collecting dust in air which passes through said air passages;

said dust collector including a discharge electrode and a dust collection electrode generally parallel to each other and spaced a predetermined distance apart;

means for applying a high voltage between said discharge electrode and said dust collection electrode, whereby electronic dust removal is effected;

said discharge electrode including a discharge line;

said means for applying a high voltage including at least one discharge line fixing part at an end of said discharge line;

said discharge line fixing part also including tensioning means for retaining said discharge line in position; and a portion of said dust collection electrode opposed to said discharge line fixing part being bent away from said discharge line fixing part, whereby abnormal discharge therebetween is avoided.

6. The air conditioner with electronic dust collector according to claim 5, wherein said dust collection electrode contains a heater for self-cleaning said dust collection electrode.

7. An air conditioner with electronic dust collector for conditioning the interior air and purifying air by collecting dust in air by using an electric discharge effect, comprising:

a casing having an air suction port and an air outlet port;

a heat exchanger in said casing facing said suction port;

a fan effective for circulating air into said suction port through said heat exchanger and air passages in said casing and out said air outlet port;

an electronic dust collector in said air passages for collecting dust in air which passes through said air passages using a discharge effect;

said dust collector including a discharge electrode and a dust collection electrode arrayed in parallel and spaced a predetermined distance apart;

a first discharge line fixing part at a first end of said discharge line;

a second discharge line fixing part at a second end of said discharge line;

at least one of said first and second discharge line fixing parts being connectable to a high voltage; and said first and second ends being bent away from said dust collector electrode so that said discharge line fixing part of said discharge electrode is spaced away from said dust collection electrode.

8. The air conditioner with electronic dust collector according to claim 7, wherein said dust collection electrode contains a heater for self-cleaning said dust collection electrode.

* * * * *